United States Patent
Takano

(10) Patent No.: US 11,824,686 B2
(45) Date of Patent: Nov. 21, 2023

(54) CONTROL DEVICE AND CONTROL METHOD

(71) Applicant: SONY GROUP CORPORATION, Tokyo (JP)

(72) Inventor: Hiroaki Takano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/756,083

(22) PCT Filed: Nov. 11, 2020

(86) PCT No.: PCT/JP2020/042155
§ 371 (c)(1),
(2) Date: May 16, 2022

(87) PCT Pub. No.: WO2021/100578
PCT Pub. Date: May 27, 2021

(65) Prior Publication Data
US 2022/0407743 A1    Dec. 22, 2022

(30) Foreign Application Priority Data
Nov. 22, 2019   (JP) ................ 2019-211496

(51) Int. Cl.
*H04L 12/54*    (2022.01)
*H04W 72/0453*  (2023.01)
*H04L 12/70*    (2013.01)

(52) U.S. Cl.
CPC ..... *H04L 12/5601* (2013.01); *H04W 72/0453* (2013.01); *H04L 2012/5603* (2013.01)

(58) Field of Classification Search
CPC ....... H04L 12/5601; H04L 2012/5603; H04W 72/0453; H04W 36/125; H04W 88/14; H04W 76/20
See application file for complete search history.

(56) References Cited

U.S. PATENT DOCUMENTS

2018/0332442 A1\* 11/2018 Shaw .................. H04L 41/0893
2019/0223093 A1   7/2019 Watfa et al.
2021/0051070 A1\* 2/2021 Akman ............... H04L 41/5019

FOREIGN PATENT DOCUMENTS

| CN | 109565746 A | 4/2019 |
|----|-------------|--------|
| EP | 3501207 A   | 6/2019 |

(Continued)

OTHER PUBLICATIONS

"LTE; General Packet Radio Service (GPRS) enhancements for Evolved Universal Terrestrial Radio Access Network (E-UTRAN) access", 3GPP TS 23.401, version 13.8.0, Release 13, Section 4.3.16, Oct. 2016, 376 pages.

(Continued)

*Primary Examiner* — Austin J Moreau
(74) *Attorney, Agent, or Firm* — CHIP LAW GROUP

(57) ABSTRACT

A control device (15a) includes a control unit configured to: acquire a switching request based on a latency measured in a first application function (AF) (30) disposed in a first network slice (5) or in a terminal device (40) communicating with the first AF (30); and switch, based on the acquired switching request, a core network to be connected to the terminal device (40) from a first core network (10a) disposed in the first network slice (5) to a second core network (10b) disposed in a second network slice (6) by using the first AF (30), or using the first AF (30) and the terminal device (40), as an anchor.

8 Claims, 12 Drawing Sheets

(56) References Cited

FOREIGN PATENT DOCUMENTS

| JP | 2018-056752 A | 4/2018 | | |
|---|---|---|---|---|
| JP | 2019-533333 A | 11/2019 | | |
| KR | 10-2019-0049698 A | 5/2019 | | |
| WO | 2018/034924 A1 | 2/2018 | | |
| WO | WO-2019096286 A1 | * | 5/2019 | ........... H04L 67/146 |
| WO | WO-2019154295 A1 | * | 8/2019 | ......... H04L 41/5003 |

OTHER PUBLICATIONS

Yamamoto, et al., "Latest trends in technology utilization of network slicing", NHK SRL R&D, No. 178, Nov. 15, 2019, pp. 04-11.
International Search Report and Written Opinion of PCT Application No. PCT/JP2020/042155, dated Feb. 9, 2021, 10 pages of ISRWO.

* cited by examiner

|  | ON-PREMISES INSTALLATION (INSTALLED IN LAN) | ON-CLOUD INSTALLATION (INSTALLED IN INTERNET) |
|---|---|---|
| SCALABILITY | POOR | GOOD |
| COST | POOR | GOOD |
| LATENCY | GOOD | POOR |
| SECURITY | GOOD | POOR |

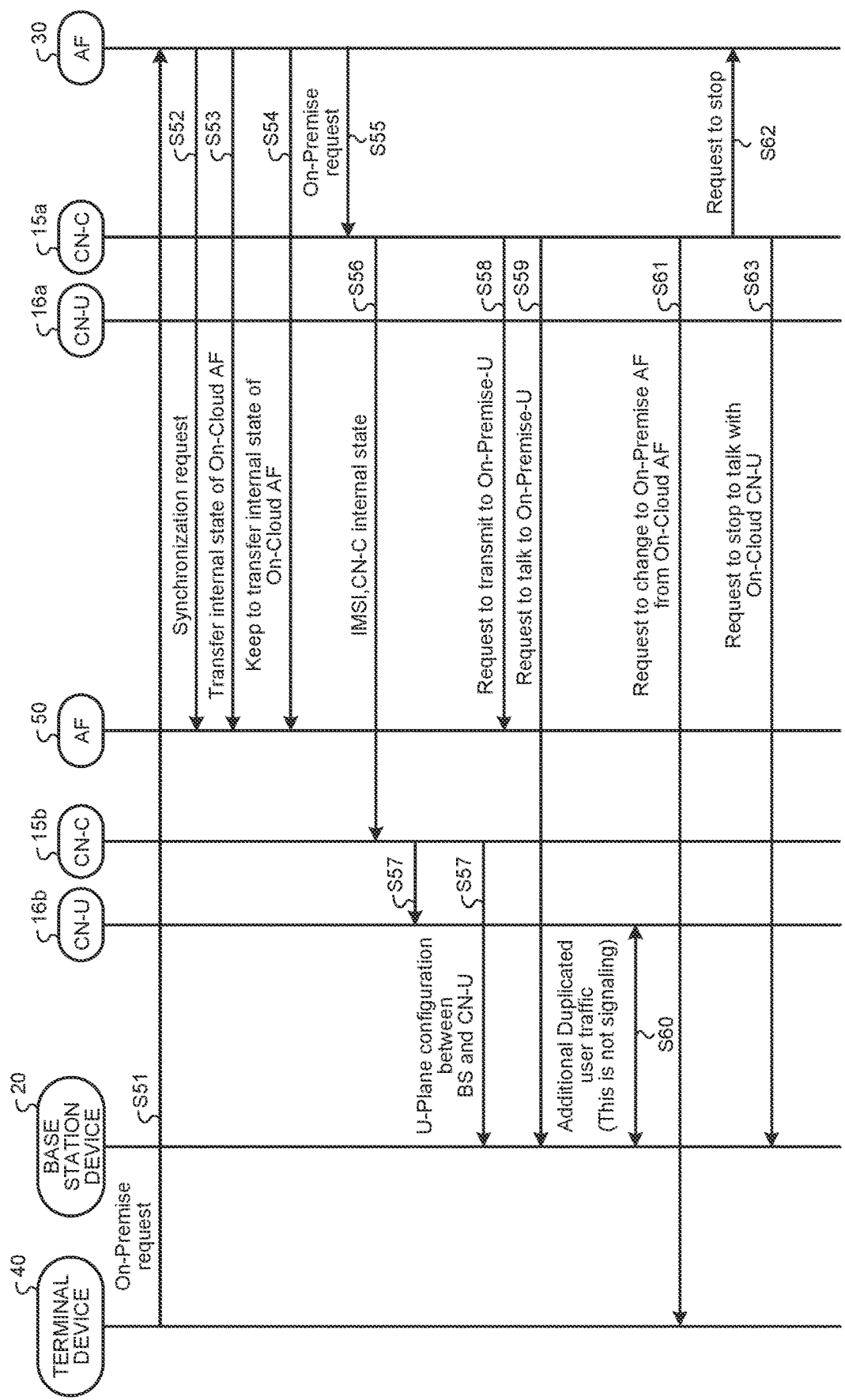

CONTROL DEVICE AND CONTROL METHOD

CROSS REFERENCE TO RELATED APPLICATIONS

This application is a U.S. National Phase of International Patent Application No. PCT/JP2020/042155 filed on Nov. 11, 2020, which claims priority benefit of Japanese Patent Application No. JP 2019-211496 filed in the Japan Patent Office on Nov. 22, 2019. Each of the above-referenced applications is hereby incorporated herein by reference in its entirety.

FIELD

The present disclosure relates to a control device and a control method.

BACKGROUND

A cellular network includes a radio access network (RAN) and a core network (CN). The RAN is a radio system between a base station and a terminal. The core network mainly performs permission and session management when the terminal connects to the network. When connecting a terminal to a network, control is performed as to which route is to be used to pass the traffic. For example, local IP access (LIPA) is known as a technology of switching traffic of a certain terminal between a core network and a local area network (LAN).

LIPA is a technology of extracting and using only user data from a base station for traffic between the base station and a terminal device. Therefore, the technology is not a technology for switching the core network but a technology for extracting user data from traffic toward the core network.

CITATION LIST

Non Patent Literature

Non Patent Literature 1: "3GPP TS 23.401 (V 13.8.0) Section 4.3.16", [Online], September 2016, [searched on Nov. 12, 2019], Internet <http://www.3gpp.org>

SUMMARY

Technical Problem

There are conceivable cases where the RAN and the core network are installed at different places depending on the use case in application. For example, installation patterns can include on-premises installation in which a core network is installed in a LAN in a factory or an office, and on-cloud installation in which a core network is installed in a data center of a cloud operator on the Internet. On-premises installation can achieve deployment of a core network near a base station or a user. Additionally, the on-premises installation also enables an application function (AF) to be installed on-premises as well, and thus is advantageous in terms of latency. On the other hand, the on-cloud installation can realize enhancement of the capability of the computer at low cost. Due to the variation of the quality of the network required by the service of the user, it is difficult to satisfy the quality required by the service of the user only by either method. That is, it is considered to be important in the future to selectively use the on-premises installation and the on-cloud installation depending on the situation.

However, the above-described known technology extracts and uses only user data from a base station for traffic between the base station and a terminal, and is not a technology of switching between on-premises installation and on-cloud installation, that is, the technology is not a core network switching technology. This makes it difficult to seamlessly switch the core network.

In view of this, the present disclosure proposes a control device and a control method capable of seamlessly switching a core network.

Solution to Problem

According to the present disclosure, a control device includes a control unit configured to: acquire a switching request based on a latency measured in a first application function (AF) disposed in a first network slice or in a terminal device communicating with the first AF; and switch, based on the acquired switching request, a core network to be connected to the terminal device from a first core network disposed in the first network slice to a second core network disposed in a second network slice by using the first AF, or using the first AF and the terminal device, as an anchor.

BRIEF DESCRIPTION OF DRAWINGS

FIG. 16 is a sequence diagram illustrating an example of switching processing according to the second embodiment of the present disclosure.

DESCRIPTION OF EMBODIMENTS

Figures 1, 2:
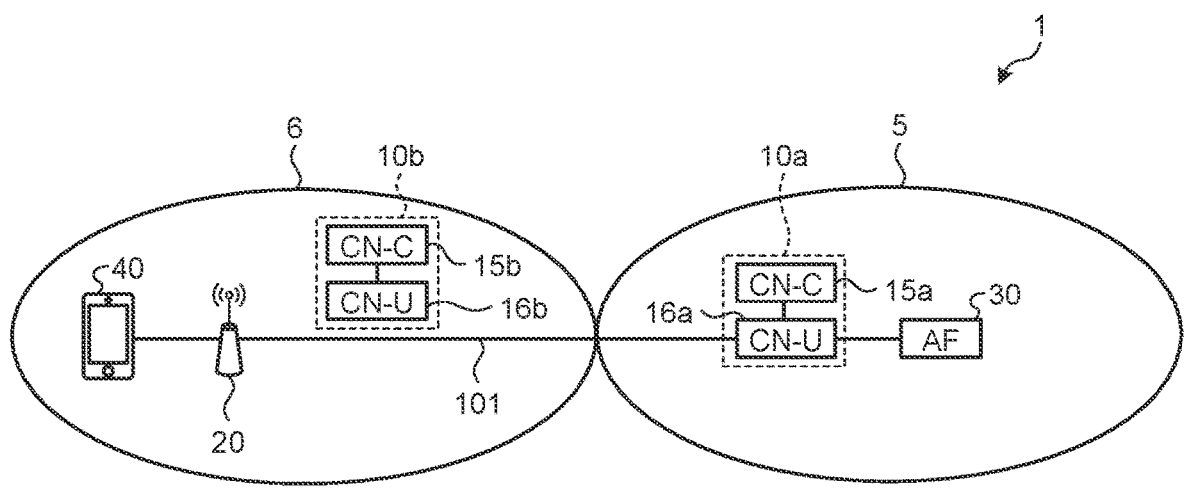
FIG. 1 is a diagram illustrating an example of comparison between on-premises installation and on-cloud installation.
FIG. 2 is a diagram illustrating an example of a configuration of a communication system according to a first embodiment of the present disclosure.

Embodiments of the present disclosure will be described below in detail with reference to the drawings. In each of the following embodiments, the same parts are denoted by the same reference symbols, and a repetitive description thereof will be omitted.

The present disclosure will be described in the following order.

1. Introduction
1-1. Cellular network and core network
1-2. On-premises installation and on-cloud installation
1-3. Utilization of plurality of resources
2. First Embodiment
2-1. Configuration of communication system
2-2. Configuration of core network
2-3. Configuration of base station device
2-4. Configuration of terminal device
2-5. Operation of communication system
3. Second Embodiment
3-1. Configuration of communication system
3-2. Operation of communication system
4. Modifications
5. Summary 1. Introduction <1-1. Cellular Network and Core Network>

The cellular network includes a RAN and a core network as described above. In both the fourth generation mobile communication system (hereinafter, also referred to as 4G) and the fifth generation mobile communication system (hereinafter, also referred to as 5G), the core network includes a Control Plane Function and a User Plane Function. The Control Plane Function acquires information from a data server referred to as a home subscriber system (HSS) storing subscriber information of a terminal device (hereinafter, also referred to as user equipment (UE)). For example, the Control Plane Function determines whether to allow the terminal device to be connected to the network based on the acquired contract information of the terminal device and the key for encryption, and generates the key for encryption, or the like. That is, in order for a terminal device to connect to a network, an international mobile subscriber identity (IMSI) in a subscriber identity module (SIM) card in the terminal device is required to be stored in the HSS. Note that the IMSI is information of a terminal device associated with a subscriber number.

When the terminal device is connected to the network, the function of the C-Plane of the CN is required. In the case of 4G, a mobility management function (MME) has taken this role. Connecting the terminal device to the network for data transmission and reception requires the function of the U-Plane of the CN. In the case of 4G, a serving gateway (S-GW) or a PDN-gateway (P-GW) has taken this role. The new core network in 5G is also provided with an entity having substantially the similar role and mechanism. In 5G, the U-Plane roles of the S-GW and the P-GW are aggregated into one entity referred to as the User Plane Function (UPF), but are basically the same as 4G.

The 4G P-GW and the 5G UPF work as a gateway to be a boundary between the CN and the general Internet. When the CN is also deployed in the general Internet, the User Plane Function of a core network, CN-U corresponding to the P-GW or the UPF, can be regarded as a gateway deployed at a boundary between the CN and a general application.

<1-2. On-Premises Installation and On-Cloud Installation>

A comparison between on-premises installation and on-cloud installation will be described with reference to FIG. 1. FIG. 1 is a diagram illustrating an example of comparison between on-premises installation and on-cloud installation. As illustrated in FIG. 1, on-premises installation can deploy a core network or AF near a base station or a user, which is advantageous in terms of latency. In addition, the on-premises installation is advantageous in terms of security because data related to the user can be held on-premises. On the other hand, the on-cloud installation can realize enhancement of the capability of the computer at low cost. Note that the on-cloud installation also includes installation on a network of an Internet Service Provider (ISP). Note that only the core network may be installed as the on-premises or on-cloud installation, or the AF may be installed in the vicinity of the core network together with the core network.

As described above, the user service requires both on-premises installation and on-cloud installation. However, when considering the operation of the cellular network in the private network, there is a case where the terminal device initially operating in the on-cloud installation desires to shift to the on-premises use due to the request of low latency. In addition, there is a case where it is desired to offload some terminals to the on-cloud operation due to an increase in the number of terminal devices that have been operated as on-premises operation. This leads to a demand for a mechanism capable of switching between on-premises installation and on-cloud installation. Note that each of the following embodiments includes techniques applicable not only to the 5G core network but also to the 4G core network.

<1-3. Utilization of Plurality of Resources>

(Network Slicing)

Network slicing is a technology having a plurality of core network resources. For example, in a computer resource A, a core network A for a user A or a use case A is prepared. In addition, in a computer resource B separate from the core network A, a core network B for a user B or a use case B is prepared. In this case, the core network A and the core network B can be referred to as a network slice A and a network slice B, respectively. The network slice A and the network slice B can customize the core network individually.

Therefore, the on-premises installation and the on-cloud installation can also be regarded as a network slice A installed as on-premises installation and a network slice B installed as on-cloud installation. Conventional network slices have a parallel relationship between network slices, in which network slices significantly different in location are not assumed. Furthermore, the conventional network slice does not assume that switching between network slices involving such special locational movement is performed using an application function (AF) as an anchor.

(Selection Function)

A conventional core network has included a function referred to as a selection function, and has instructed which C-Plane Function and U-Plane Function should be used when a terminal device attaches to the network. This has assumed that the same functions are used while the terminal device is attached. The conventional selection function is a function of only designating a specific network slice in an Attach Procedure in which a terminal device makes a connection request to a network, and is different from descriptions in each of the following embodiments. In contrast, each of the following embodiments provides functions of a new Network Slice Selection Function (NSSF) that enables switching and selection of a network slice using an application as an anchor point.

That is, in a known technology, when a terminal device is connecting to a network, a selection function has selected which network to use, and made a connection so as to use the selected network. Each of the following embodiments presents a technique of seamlessly switching a network during the use of the network by the terminal device, rather than selection of the network at the time of connection. For example, AF on the terminal device side or a wireless function or a core network or AF on the network side works as an anchor point so as to allow switching of each function of the core network. Note that the anchor point (hereinafter, also referred to as an anchor) is, for example, an entity working as a fulcrum, such as a terminal device or AF to be used at network slice switching. For example, in a case where there are entities A1, B1, and B2 and the connection of A1-B1 is to be switched to A1-B2, the entity A1 is referred to as an anchor.

2. First Embodiment

<2-1. Configuration of Communication System>

A communication system 1 includes a base station device and can be connected to a terminal device by radio communication.

The communication system 1 may be compatible with a radio access technology (RAT) such as long term evolution (LTE) and new radio (NR). LTE and NR are a type of cellular communication technology, and enable mobile communication of terminal devices by using cellular arrangement of a plurality of areas covered by base stations.

FIG. 2 is a diagram illustrating an example of a configuration of a communication system according to the first embodiment of the present disclosure. As illustrated in FIG. 2, the communication system 1 includes a network slice 5 which is an on-cloud network slice and a network slice 6 which is an on-premises network slice. The network slice 5 includes a data center on the Internet and an ISP server, for example. The network slice 6 includes a server installed in a factory, an office, or a home, for example.

The network slice 5 is provided with a core network 10a and an application function 30 (AF 30). Meanwhile, the network slice 6 is provided with a core network 10b and a base station device 20, and includes a terminal device 40 connected to the base station device 20. That is, the core network 10a is installed as an on-cloud network, and the core network 10b is installed as an on-premises network. Furthermore, the terminal device 40 is connected to the core network 10a installed as on-cloud installation via the base station device 20. In the following description, the core networks 10a and 10b will be referred to as a core network 10 when the networks are not to be distinguished from each other.

The core networks 10a and 10b are, for example, networks of predetermined entities such as mobile communication carriers. The core networks 10a and 10b are, for example, evolved packet cores (EPC) or 5G core networks (5GC). The core networks 10a and 10b have a CN-C 15a and a CN-U 16a, and a CN-C 1515b and a CN-U 16b, respectively. The CN-C 15a and CN-C 15b are C-Plane Functions, and are Control Plane nodes that manage a radio network, such as a management device, for example. The CN-U 16a and CN-U 16b are U-Plane Functions, and are User Plane nodes that transfer user data between either of a packet data network (PDN) or data network (DN) and the RAN.

The base station device 20 is a radio communication device that performs radio communication with the terminal device 40. The base station device 20 is a type of communication device. The base station device 20 is also a type of information processing device. The base station device 20 is, for example, a device corresponding to a radio base station (Base Station, Node B, eNB, gNB, etc.) or a radio access point. The base station device 20 is connected to the CN-U 16a, thereby establishing a route 101. That is, the terminal device 40 and the AF 30 can communicate with each other via the base station device 20, the route 101, and the CN-U 16a.

The AF 30 is a server that provides an application to the terminal device 40. Examples of the application provided by the AF 30 include an online game and virtual reality (VR) content.

The terminal device 40 is a radio communication device that performs radio communication with the base station device 20. Examples of the terminal device 40 include a mobile phone, a smart device (smartphone or tablet), a personal digital assistant (PDA), or a personal computer. The terminal device 40 uses the application provided by the AF 30 via the base station device 20, the route 101, and the CN-U 16a.

<2-2. Configuration of Core Network>

Figure 3:
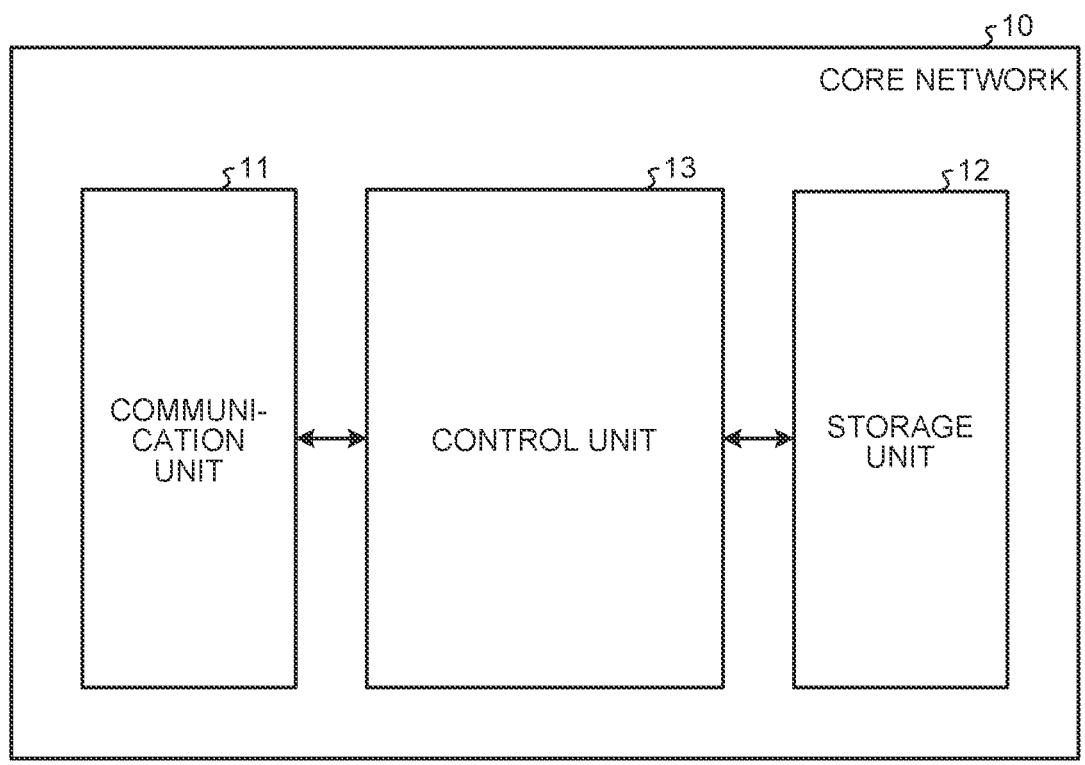
FIG. 3 is a diagram illustrating an example of a configuration of a core network according to the first embodiment of the present disclosure.

FIG. 3 is a diagram illustrating an example of a configuration of a core network according to the first embodiment of the present disclosure. The core network 10 includes a communication unit 11, a storage unit 12, and a control unit 13. Note that the configuration illustrated in FIG. 3 is a functional configuration, and the hardware configuration may be different from this. Furthermore, the functions of the core network 10 may be implemented in a distributed manner in a plurality of physically separated configurations. For example, the core network 10 may include a plurality of server devices.

The communication unit 11 is a communication interface for communicating with other devices. The communication unit 11 may be a network interface, or may be a device connection interface. For example, the communication unit 11 may be a LAN interface such as a network interface card (NIC), or may be a universal serial bus (USB) interface including a USB host controller, a USB port, and the like. Furthermore, the communication unit 11 may be a wired interface, or may be a wireless interface. The communication unit 11 functions as a communication means of the core network 10. The communication unit 11 communicates with the base station device 20 under the control of the control unit 13.

The storage unit 12 is a data readable/writable storage device such as dynamic random access memory (DRAM), static random access memory (SRAM), a flash drive, or a hard disk. The storage unit 12 functions as a storage means of the core network 10. The storage unit 12 stores, for example, a connection state of the terminal device 40. For example, the storage unit 12 stores a radio resource control (RRC) state and an EPS connection management (ECM)

state of the terminal device 40. The storage unit 12 may function as a unit referred to as "home memory" (user information database) that stores the positional information of the terminal device 40.

The control unit 13 is a controller that controls individual units of the core network 10. The control unit 13 is realized by a processor such as a central processing unit (CPU) or a micro processing unit (MPU), for example. For example, the control unit 13 is realized by execution of various programs stored in the storage device inside the core network 10 by the processor using random access memory (RAM) or the like as a work area. Note that the control unit 13 may be realized by an integrated circuit such as an application specific integrated circuit (ASIC) or a field programmable gate array (FPGA). The CPU, MPU, ASIC, and FPGA can all be regarded as controllers.

<2-3. Configuration of Base Station Device>

Figure 4:
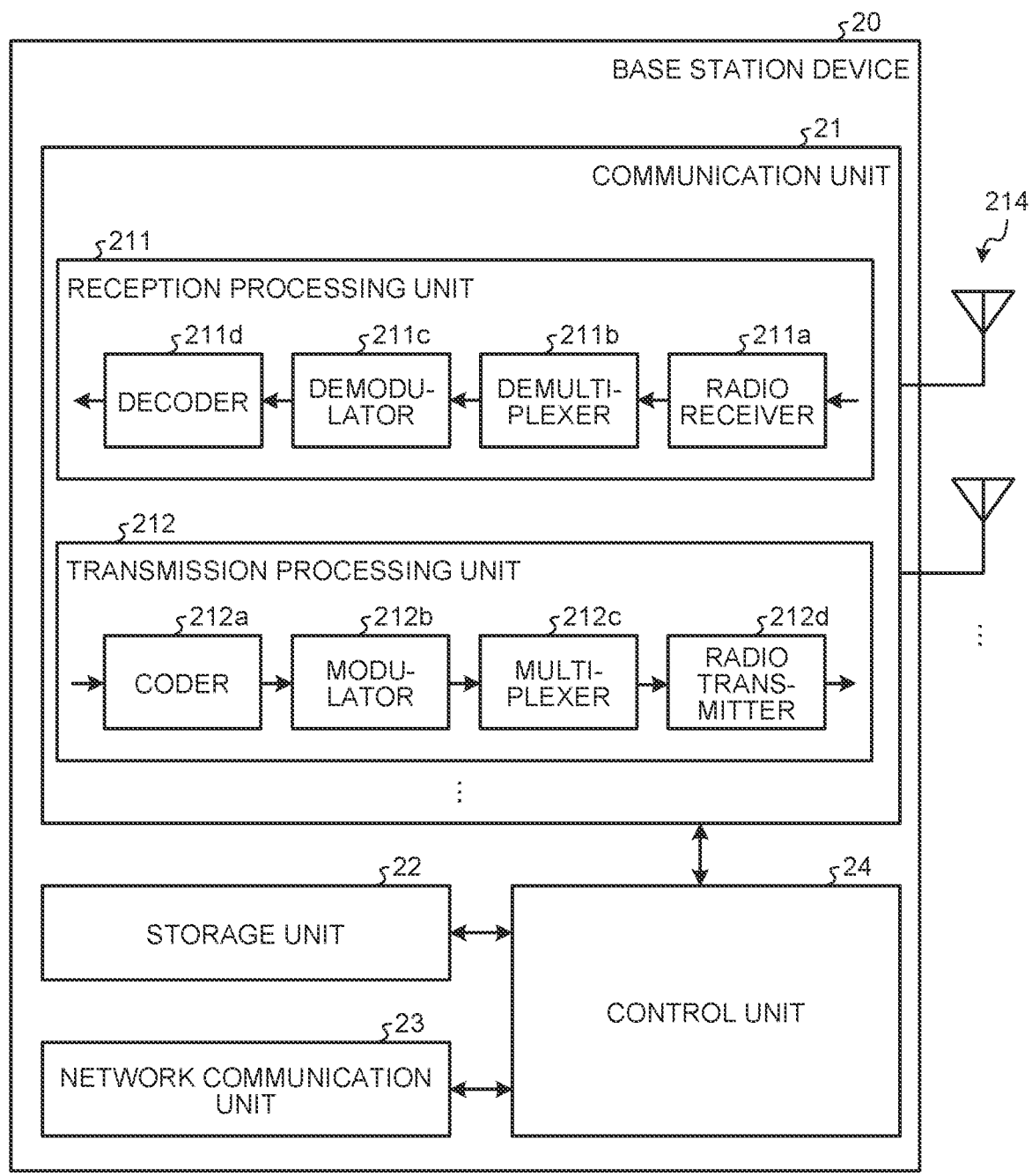
FIG. 4 is a diagram illustrating an example of a configuration of a base station device according to the first embodiment of the present disclosure.

Next, a configuration of the base station device 20 will be described. FIG. 4 is a diagram illustrating an example of a configuration of a base station device according to the first embodiment of the present disclosure. The base station device 20 can simultaneously perform data transmission and data reception using the same band. For example, the terminal device 40 can perform in-band full-duplex communication with another radio communication device such as the base station device 20. The base station device 20 may be capable of non-orthogonal multiple access (NOMA) communication with other radio communication devices.

The base station device 20 includes a communication unit 21, a storage unit 22, a network communication unit 23, and a control unit 24. Note that the configuration illustrated in FIG. 4 is a functional configuration, and the hardware configuration may be different from this. Furthermore, the functions of the base station device 20 may be implemented in a distributed manner in a plurality of physically separated devices.

The communication unit 21 is a signal processing unit for performing radio communication with other radio communication device (for example, the terminal device 40 and another base station device 20). The communication unit 21 can simultaneously perform data transmission and data reception using the same band. For example, the base station device 20 is capable of full-band in-band full-duplex communication with other communication devices such as the terminal device 40. The communication unit 21 operates under the control of the control unit 24. The communication unit 21 may support one or a plurality of radio access methods. For example, the communication unit 21 supports both NR and LTE. The communication unit 21 may support wideband code division multiple access (W-CDMA) or code division multiple access 2000 (cdma 2000) in addition to NR and LTE. Furthermore, the communication unit 21 may support communication using NOMA.

The communication unit 21 includes a reception processing unit 211, a transmission processing unit 212, and an antenna 214. The communication unit 21 may include a plurality of the reception processing units 211, a plurality of the transmission processing units 212, and a plurality of the antennas 214. In a case where the communication unit 21 supports a plurality of radio access methods, individual portions of the communication unit 21 can be configured separately for each of the radio access methods. For example, the reception processing unit 211 and the transmission processing unit 212 may be individually configured depending on LTE and NR.

The reception processing unit 211 processes an uplink signal received via the antenna 214. The reception processing unit 211 includes a radio receiver 211a, a demultiplexer 211b, a demodulator 211c, and a decoder 211d.

For example, the radio receiver 211a performs processing on the uplink signal, such as down-conversion, removal of unnecessary frequency components, amplification level control, orthogonal demodulation, conversion to digital signal, removal of guard interval (cyclic prefix), and frequency domain signal extraction using fast Fourier transform. The demultiplexer 211b demultiplexes an uplink channel such as a physical uplink shared channel (PUSCH) or a physical uplink control channel (PUCCH) and an uplink reference signal from the signal output from the radio receiver 211a. Using a modulation scheme such as binary phase shift keying (BPSK) or quadrature phase shift keying (QPSK) for the modulation symbol of the uplink channel, the demodulator 211c demodulates the received signal. The modulation scheme used by the demodulator 211c may be 16 quadrature amplitude modulation (QAM), 64 QAM, or 256 QAM. In this case, the signal points on the constellation do not necessarily have to be equidistant. The constellation may be a non uniform constellation (NUC). The decoder 211d performs decoding processing on the demodulated coded bits of the uplink channel. The decoded uplink data and uplink control information are output to the control unit 24.

The transmission processing unit 212 performs transmission processing of downlink control information and downlink data. The transmission processing unit 212 includes a coder 212a, a modulator 212b, a multiplexer 212c, and a radio transmitter 212d.

The coder 212a encodes the downlink control information and the downlink data input from the control unit 24 by using a coding method such as block coding, convolutional coding, or turbo coding. The coder 212a may be coded by a polar code or a low density parity check code (LDPC code). The modulator 212b modulates the coded bits output from the coder 212a by a predetermined modulation scheme such as BPSK, QPSK, 16 QAM, 64 QAM, or 256 QAM. In this case, the signal points on the constellation do not necessarily have to be equidistant. The constellation may be a non uniform constellation. The multiplexer 212c multiplexes the modulation symbol of each of channels and the downlink reference signal and allocates the multiplexed signals on a predetermined resource element. The radio transmitter 212d performs various types of signal processing on the signal from the multiplexer 212c. For example, the radio transmitter 212d performs processing such as conversion to the time domain using fast Fourier transform, addition of a guard interval (cyclic prefix), generation of a baseband digital signal, conversion to an analog signal, quadrature modulation, upconvert, removal of extra frequency components, and power amplification. The signal generated by the transmission processing unit 212 is transmitted from the antenna 214.

The storage unit 22 is a data readable/writable storage device such as DRAM, SRAM, a flash drive, and a hard disk. The storage unit 22 functions as a storage means in the base station device 20.

The network communication unit 23 is a communication interface for communicating with a node (for example, the core network 10) located at a higher level on the network. For example, the network communication unit 23 is a LAN interface such as an NIC. Furthermore, the network communication unit 23 may be a wired interface, or may be a wireless interface. The network communication unit 23 functions as a network communication means of the base station device 20.

The control unit 24 is a controller that controls individual parts of the base station device 20. The control unit 24 is realized by a processor (hardware processor) such as a CPU or MPU, for example. For example, the control unit 24 is realized by a processor executing various programs stored in a storage device inside the base station device 20 using RAM or the like as a work area. Note that the control unit 24 may be realized by an integrated circuit such as an ASIC or an FPGA. The CPU, MPU, ASIC, and FPGA can all be regarded as controllers.

<2-4. Configuration of Terminal Device>

Figure 5:
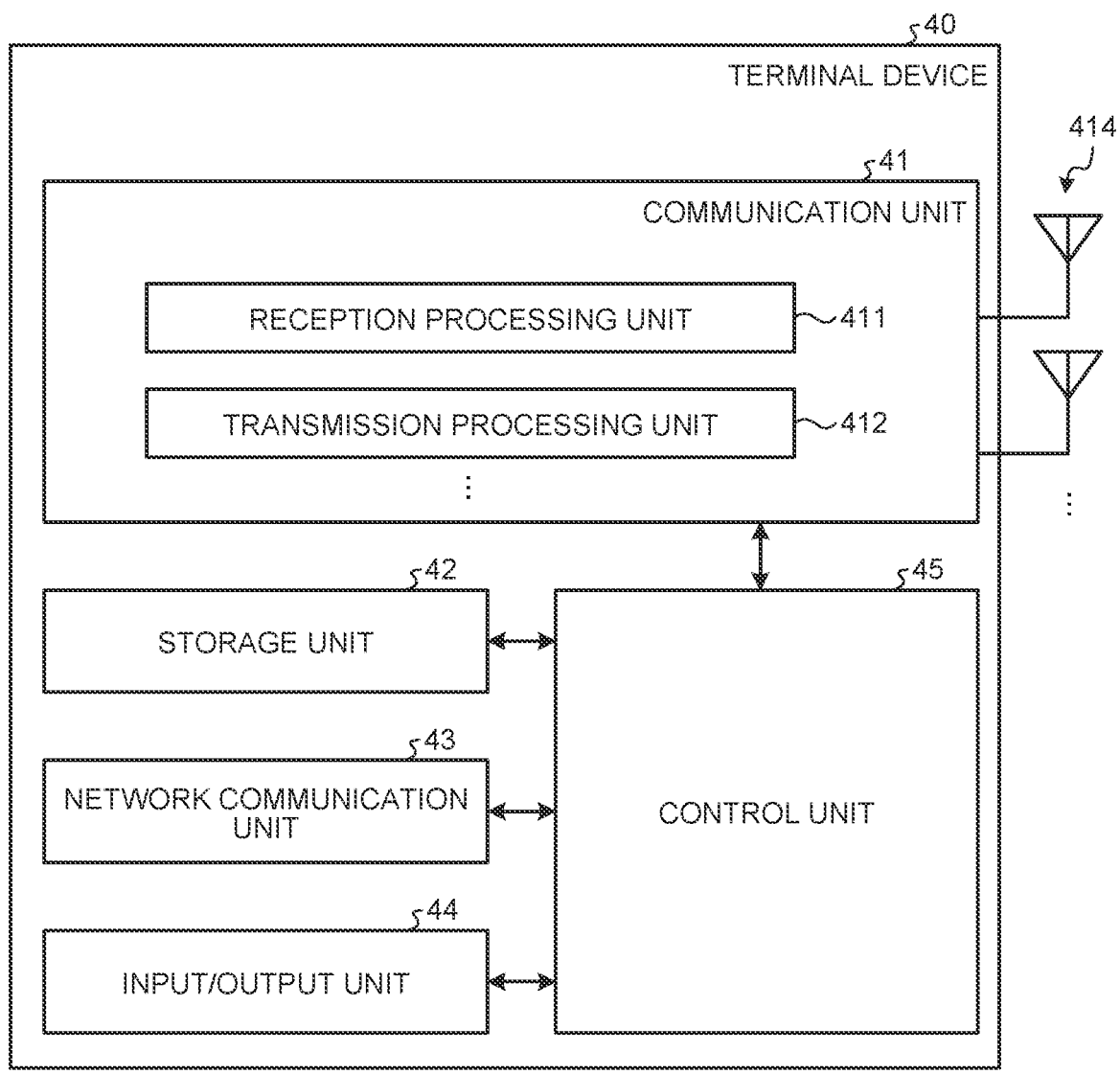
FIG. 5 is a diagram illustrating an example of a configuration of a terminal device according to the first embodiment of the present disclosure.

Next, a configuration of the terminal device 40 will be described. FIG. 5 is a diagram illustrating an example of a configuration of a terminal device according to the first embodiment of the present disclosure. The terminal device 40 can simultaneously perform data transmission and data reception using the same band. For example, the terminal device 40 can perform in-band full-duplex communication with another radio communication device such as the base station device 20. The terminal device 40 may be capable of NOMA communication with other radio communication devices.

The terminal device 40 includes a communication unit 41, a storage unit 42, a network communication unit 43, an input/output unit 44, and a control unit 45. Note that the configuration illustrated in FIG. 5 is a functional configuration, and the hardware configuration may be different from this. Furthermore, the functions of the terminal device 40 may be implemented in a distributed manner in a plurality of physically separated configurations. In the configuration of the terminal device 40, the network communication unit 43 and input/output unit 44 do not have to be indispensable components.

The communication unit 41 is a signal processing unit for radio communication with other radio communication devices (for example, the base station device 20 and another terminal device 40). The communication unit 41 can simultaneously perform data transmission and data reception using the same band. For example, the communication unit 41 can perform in-band full-duplex communication with other communication devices such as the base station device 20 and the terminal device 40. The communication unit 41 operates under the control of the control unit 45. The communication unit 41 may support one or a plurality of radio access methods. For example, the communication unit 41 supports both NR and LTE. The communication unit 41 may support W-CDMA and cdma2000 in addition to NR and LTE. Furthermore, the communication unit 41 may support communication using NOMA.

The communication unit 41 includes a reception processing unit 411, a transmission processing unit 412, and an antenna 414. The communication unit 41 may include a plurality of reception processing units 411, a plurality of transmission processing units 412, and a plurality of antennas 414. Configurations of the communication unit 41, the reception processing unit 411, the transmission processing unit 412, and the antenna 414 are similar to those of the communication unit 21, the reception processing unit 211, the transmission processing unit 212, and the antenna 214 of the base station device 20.

The storage unit 42 is a data readable/writable storage device such as DRAM, SRAM, a flash drive, and a hard disk. The storage unit 42 functions as a storage means in the terminal device 40. The storage unit 42 stores the setting information acquired from the base station device 20.

The network communication unit 43 is a communication interface for communicating with a node located at a higher level on the network. For example, the network communication unit 43 is a LAN interface such as an NIC. Furthermore, the network communication unit 43 may be a wired interface, or may be a wireless interface. The network communication unit 43 functions as a network communication means of the terminal device 40. The network communication unit 43 communicates with other devices under the control of the control unit 45.

The input/output unit 44 is a user interface for exchanging information with the user. For example, the input/output unit 44 is an operation device such as a keyboard, a mouse, operation keys, and a touch panel, used by a user to perform various operations. Alternatively, the input/output unit 44 is a display device such as a liquid crystal display, or an organic electroluminescence (EL) display. The input/output unit 44 may be an acoustic device such as a speaker or a buzzer. Furthermore, the input/output unit 44 may be a lighting device such as a light emitting diode (LED) lamp. The input/output unit 44 functions as an input/output means (input means, output means, operation means, or notification means) provided on the terminal device 40.

The control unit 45 is a controller that controls individual parts of the terminal device 40. The control unit 45 is realized by a processor (hardware processor) such as a CPU or MPU, for example. For example, the control unit 45 is realized by a processor executing various programs stored in a storage device inside the terminal device 40 using RAM or the like as a work area. Note that the control unit 45 may be realized by an integrated circuit such as an ASIC or an FPGA. The CPU, MPU, ASIC, and FPGA can all be regarded as controllers.

<2-5. Operation of Communication System>

The configuration of the communication system 1 has been described above. Next, operations of the communication system 1 will be described.

Figure 6:
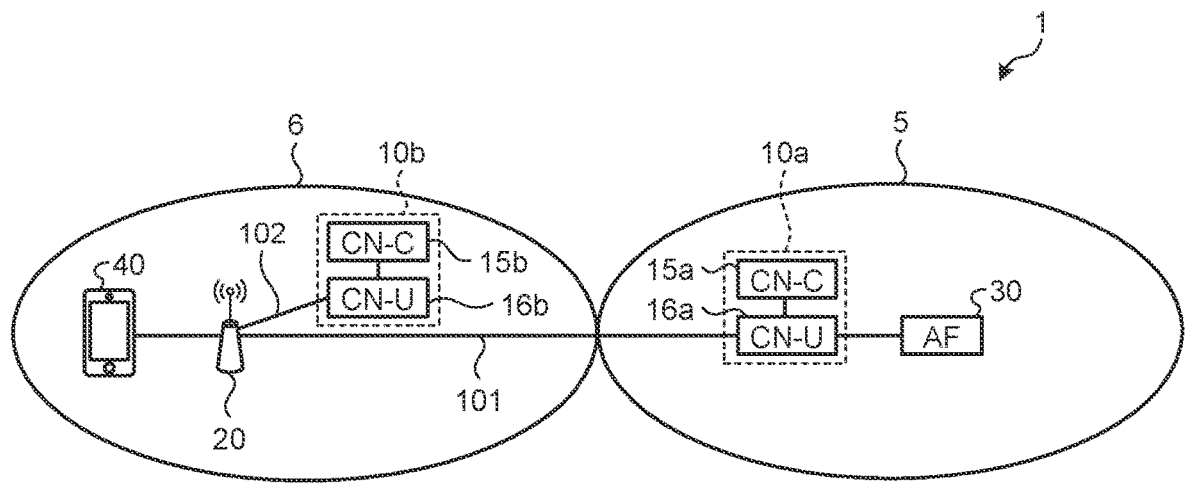
FIG. 6 is a diagram illustrating an example of switching of the core network according to the first embodiment of the present disclosure.
Figure 7:
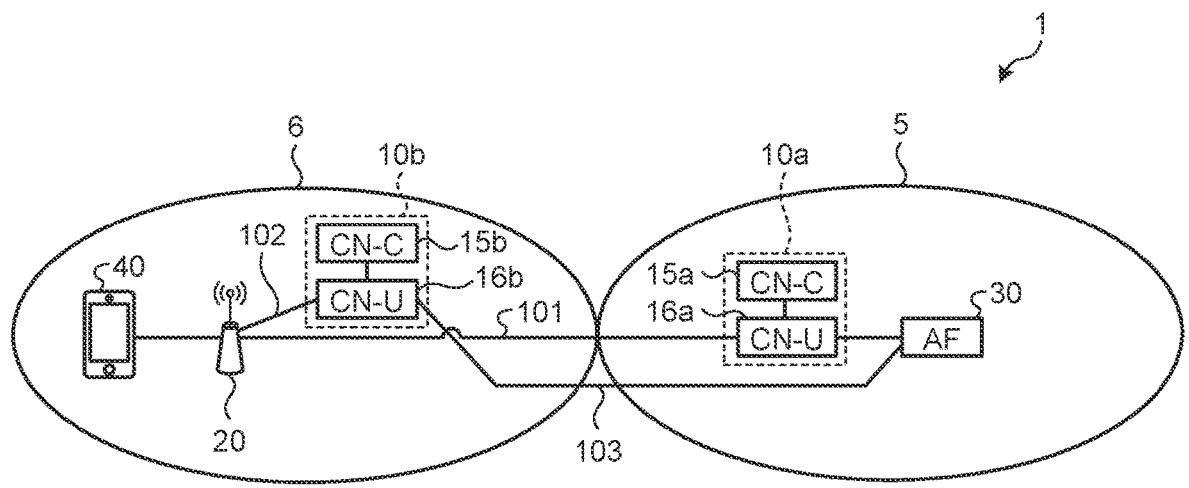
FIG. 7 is a diagram illustrating an example of switching of the core network according to the first embodiment of the present disclosure.
Figure 8:
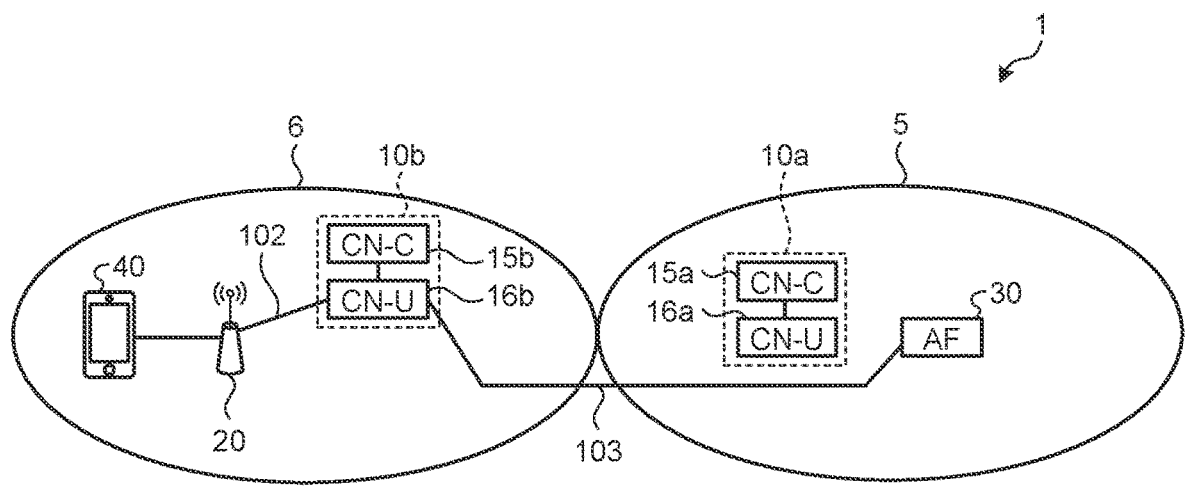
FIG. 8 is a diagram illustrating an example of switching of the core network according to the first embodiment of the present disclosure.

First, as illustrated in FIG. 2 as an initial state, the communication system 1 is assumed to have a configuration in which the terminal device 40 is connected to the core network 10a installed as on-cloud installation (CN-U 16a). Furthermore, the present embodiment will describe a case where the connection destination of the terminal device 40 required to have low latency is shifted from the core network 10a installed as on-cloud installation to the core network 10b installed as on-premises installation. In addition, an operation state of communication system 1 will be described with reference to FIGS. 6 to 8. FIGS. 6 to 8 are diagrams illustrating an example of switching of the core network according to the first embodiment of the present disclosure.

The terminal device 40 periodically measures the latency occurring between the terminal device 40 and the AF 30. In the terminal device 40, for example, an UE-side application (AF_UE) in an application provided by the AF 30 measures the latency. The UE-side application measures the latency by using an Internet control message protocol (ICMP). Having determined that the latency is a threshold being a reference for switching from the on-cloud installation to the on-premises installation or less, the terminal device 40 transmits a switching request for using the core network 10b installed as on-premises installation to the CN-C 15a of the connected core network 10a.

Having received the switching request from the terminal device 40, the CN-C 15a notifies the CN-C 15b of the core network 10b installed as on-premises installation of the IMSI of the terminal device 40 and state information indicating the state of the terminal device 40. The state of the terminal device 40 indicates whether the state of the RAN, that is, the state between the terminal device 40 and the base station device 20 and the state between the base station device 20 and the CN-U 16a of the core network 10a are ON or OFF. The state ON is a state in which the terminal device 40 can exchange User Plane Traffic with the core network 10a via the wireless interface. In 5G, the state ON is referred to as CM-Connected and the state OFF is referred to as CM-Idle. The state of the terminal device 40 further includes information indicating whether the terminal device 40 is in an ON state in a CN-C 15a (C-Plane Function). When the terminal device 40 is ON in the CN-C 15a, an Internet protocol (IP) address has been assigned to the terminal device 40, and the CN-C 15a grasps the approximate location of the terminal device 40.

Having received the IMSI and the state information of the terminal device 40 from the CN-C 15a, the CN-C 15b exchanges IP address with the base station device 20 so as to allow the U-Plane to be established between the base station device 20 and the CN-U 16b. That is, as illustrated in FIG. 6, tunneling is formed between the base station device 20 and the CN-C 15b to set a route 102. In addition, the CN-C 15a sets the base station device 20 to pass the traffic to the core network 10b side for uplink traffic. That is, the base station device 20 passes the same traffic through the routes 101 and 102.

The CN-C 15a sets the AF 30 to pass the same packet to the CN-U 16a and the CN-U 16b for downlink traffic. That is, as illustrated in FIG. 7, the AF 30 sets a route 103 between the AF 30 and the CN-U 16b, and passes the same traffic to the route 101 via the CN-U 16a and to the route 103. In addition, since the base station device 20 is set to transmit the same packet to the CN-U 16a and the CN-U 16b, the same traffic is passed through the route 101 and the routes 102 and 103. The transmission of the packet can be performed by using protocols such as a user datagram protocol (UDP), a transmission control protocol (TCP), and a stream control transmission protocol (SCTP).

When having received ACK from the AF 30 set to perform duplicate transmission of the packet, the CN-C 15a waits for a preset predetermined time T and then transmits a stop signal to the base station device 20 and the AF 30. As illustrated in FIG. 8, the CN-C 15a sets the AF 30 to stop transmission of a packet for the CN-U 16a and transmit only the packet for the CN-U 16b for the downlink traffic. Furthermore, the CN-C 15a sets the base station device 20 to stop transmission of a packet for the CN-U 16a and transmit only the packet for the CN-U 16b for uplink traffic. In this manner, in the communication system 1, switching from the core network 10a to the core network 10b can be performed between the terminal device 40 and the AF 30. That is, seamless switching of the core networks using the AF 30 as an anchor point is achieved for the downlink traffic. In addition, seamless switching of the core networks using the base station device 20 as an anchor point is achieved for the uplink traffic.

Figure 9:
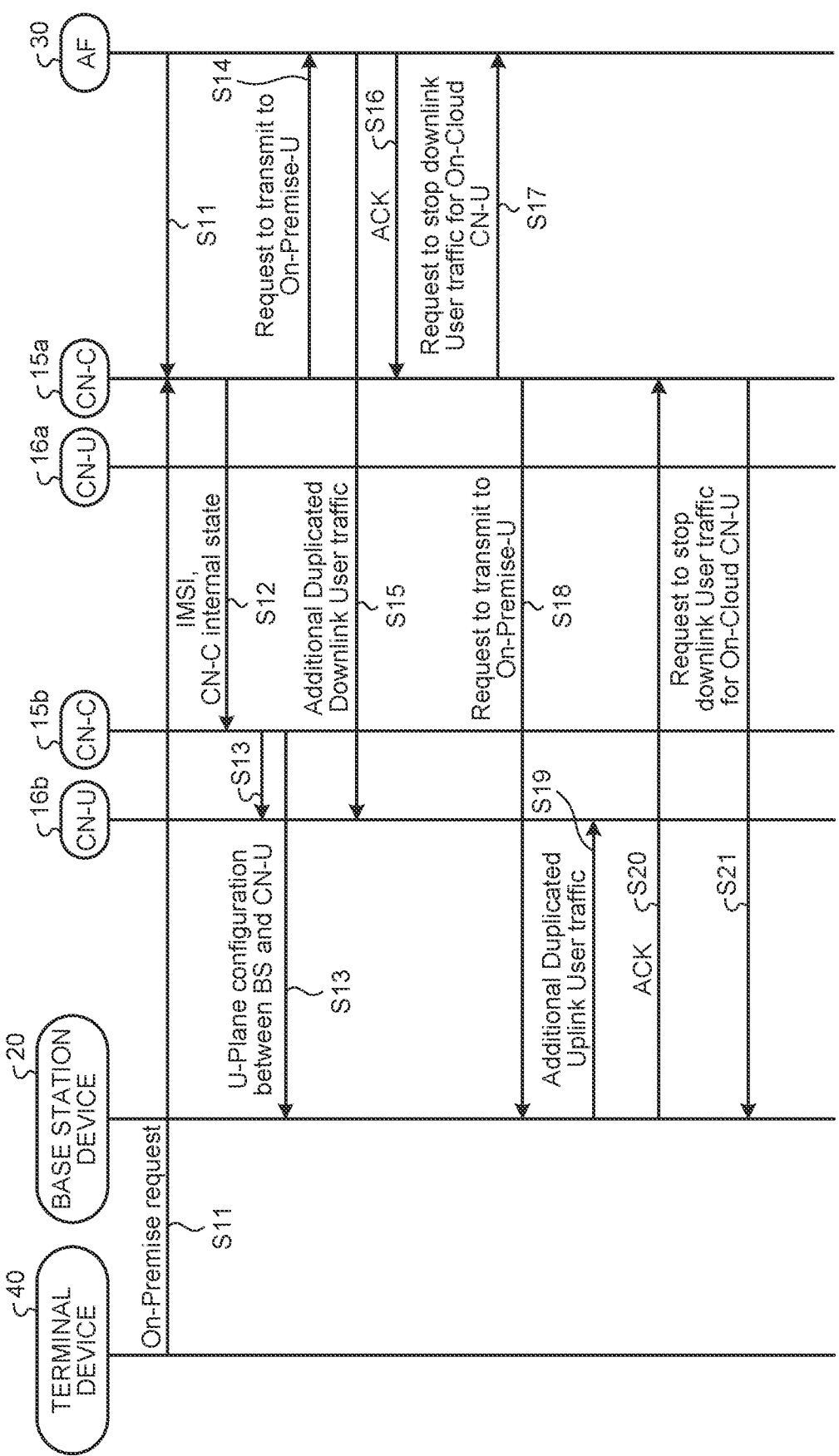
FIG. 9 is a sequence diagram illustrating an example of switching processing according to the first embodiment of the present disclosure.

Next, switching processing in the first embodiment will be described with reference to a sequence diagram. FIG. 9 is a sequence diagram illustrating an example of switching processing according to the first embodiment of the present disclosure. As illustrated in FIG. 9, based on a measured latency, the terminal device 40 or the AF 30 transmits a request for switching to the on-premises installation to the CN-C 15a (step S11).

The CN-C 15a notifies the CN-C 15b of the IMSI of the terminal device 40 and the state information indicating the state of the terminal device 40 (step S12). Having received the IMSI and the state information regarding the terminal device 40 from the CN-C 15a, the CN-C 15b establishes a U-Plane between the base station device 20 and the CN-U 16b (step S13).

The CN-C 15a sets the AF 30 to transmit the same packet to the CN-U 16a and the CN-U 16b for downlink traffic (step S14). The AF 30 passes the same traffic to the CN-U 16a and the CN-U 16b (step S15), and returns ACK to the CN-C 15a (step S16). Having received the ACK from the AF 30, the CN-C 15a waits for a predetermined time T set in advance, and then transmits a stop signal to the AF 30 (step S17).

The CN-C 15a sets the base station device 20 to pass the traffic also to the core network 10b side for the uplink traffic (step S18). The base station device 20 passes the same traffic to the CN-U 16a and the CN-U 16b (step S19), and returns ACK to the CN-C 15a (step S20). Having received the ACK from the base station device 20, the CN-C 15a waits for a preset predetermined time T and then transmits a stop signal to the base station device 20 (step S21). This makes it possible to seamlessly switch the core network. Note that steps S14 to S17 and steps S18 to S21 may run in parallel.

Figure 10:
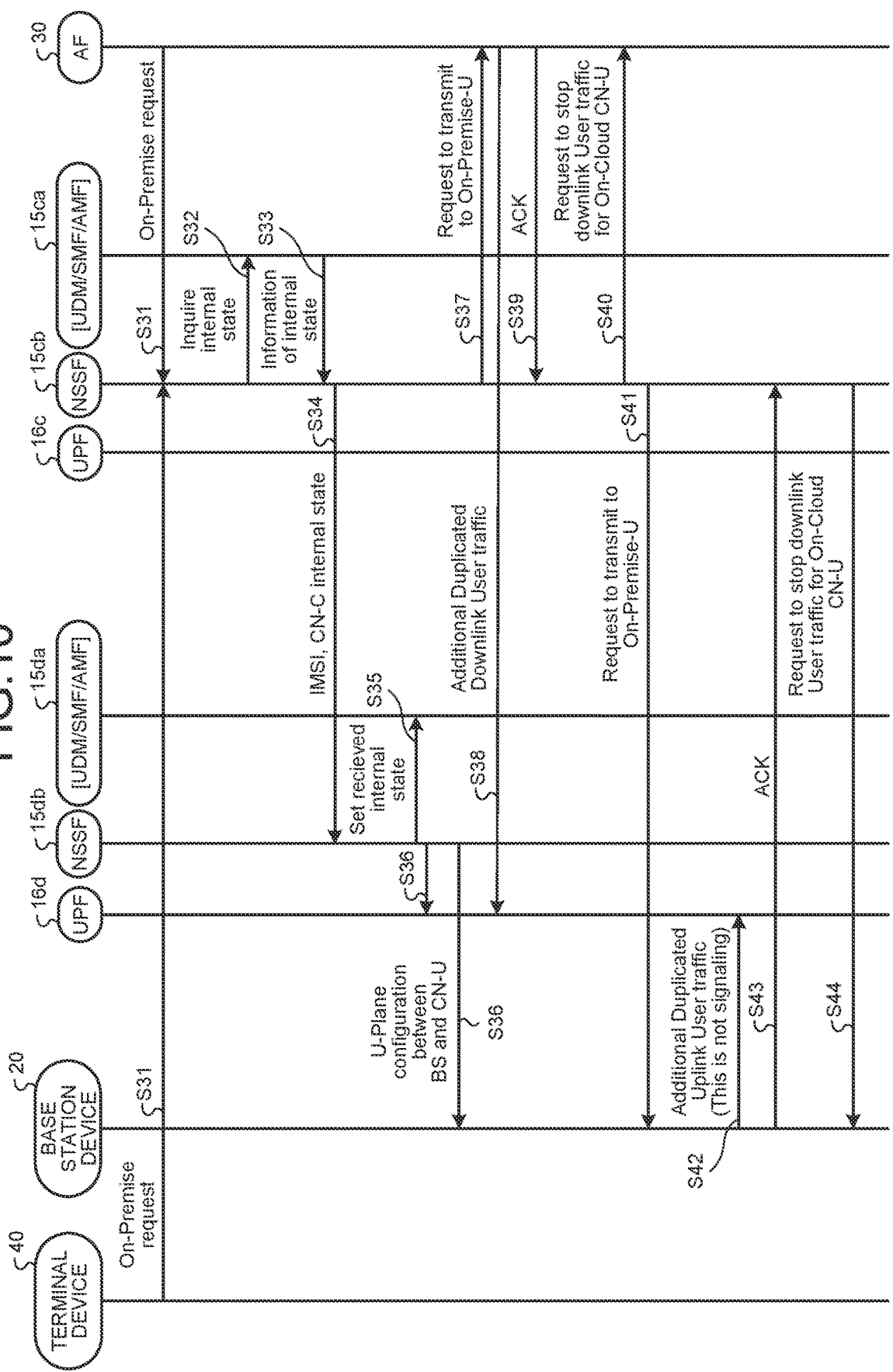
FIG. 10 is a sequence diagram illustrating an example in 5G of the switching processing according to the first embodiment of the present disclosure.

Next, a case where the switching processing in the first embodiment is applied to 5G will be described with reference to a sequence diagram. FIG. 10 is a sequence diagram illustrating an example in 5G of the switching processing according to the first embodiment of the present disclosure. In FIG. 10, UPF 16c and UPF 16d correspond to CN-U 16a and CN-U 16b in FIG. 9, respectively. Furthermore, [UDM/SMF/AMF] 15ca (hereinafter, referred to as UDM-others-15ca) and NSSF 15cb correspond to CN-C 15a. Similarly, [UDM/SMF/AMF] 15da (hereinafter, referred to as UDM-others-15da) and NSSF 15db correspond to CN-C 15b. Although not illustrated, UDM-others-15ca and UDM-others-15da also include AUSF, NEF, NRF, and PCF.

Note that the UPF is an entity for connecting user data to the Internet side. An authentication server function (AUSF) is an entity for checking whether the terminal device 40 is authorized to connect to a network. An access and mobility management function (AMF) is a function of controlling handover of the terminal device 40. The session management function (SMF) is a function of instructing each entity to generate a route when the terminal device 40 generates a new communication route referred to as a bearer. The NSSF is a function of selecting and allocating a network slice to the terminal device 40. A network exposure function (NEF) is a gateway for disclosing information regarding a state in a core network to the outside. A network repository function (NRF) is a function for enabling registration and use of each function in a core network. Unified data management (UDM) is a function for managing subscriber data in a core network. A policy control function (PCF) assigns Quality of Service (QoS) to a bearer.

As illustrated in FIG. 10, based on the measured latency, the terminal device 40 or the AF 30 transmits, to the NSSF 15cb, a request for switching to the on-premises installation (step S31). The NSSF 15cb requests the UDM-others-15ca to transmit an internal state (step S32). The UDM-others-15ca returns the internal state to the NSSF 15cb in response to the request (step S33). Note that the internal state includes the IMSI of the terminal device 40 and state information indicating the state of the terminal device 40. The NSSF 15cb transfers the internal state to the NSSF 15db (step S34). The NSSF 15db copies the received internal state to UDM-others-15da (step S35). The NSSF 15db establishes a U-Plane between the base station device 20 and the UPF 16d (step S36).

NSSF 15cb sets the AF 30 to transmit the same packet to UPF 16c and UPF 16d for downlink traffic (step S37). The AF 30 passes the same traffic to the UPF 16c and the UPF 16d (step S38), and returns ACK to the NSSF 15cb (step S39). Having received the ACK from the AF 30, the NSSF 15cb waits for a preset predetermined time T and then transmits a stop signal to the AF 30 (step S40).

The NSSF 15cb sets the base station device 20 to pass the traffic also to the core network 10b side for uplink traffic (step S41). The base station device 20 passes the same traffic to the UPF 16c and the UPF 16d (step S42), and returns ACK to the NSSF 15cb (step S43). Having received the ACK from the base station device 20, the NSSF 15cb waits for a preset predetermined time T and then transmits a stop signal to the base station device 20 (step S44). This makes it possible to seamlessly switch the core network. Similarly to FIG. 9, steps S37 to S40 and steps S41 to S44 may run in parallel.

3. Second Embodiment

<3-1. Configuration of Communication System>

In the first embodiment, since the core network is switched using the AF 30 as an anchor point for the downlink traffic, the AF 30 remains to be located as the on-cloud installation. Meanwhile, the AF 30 may also be shifted to the network slice 6, and this case will be described as a second embodiment. Since the second embodiment uses the core network 10, the base station device 20, the AF 30, and the terminal device 40 having the same configurations as those of the first embodiment, redundant description of configurations and operations will be omitted.

Figure 11:
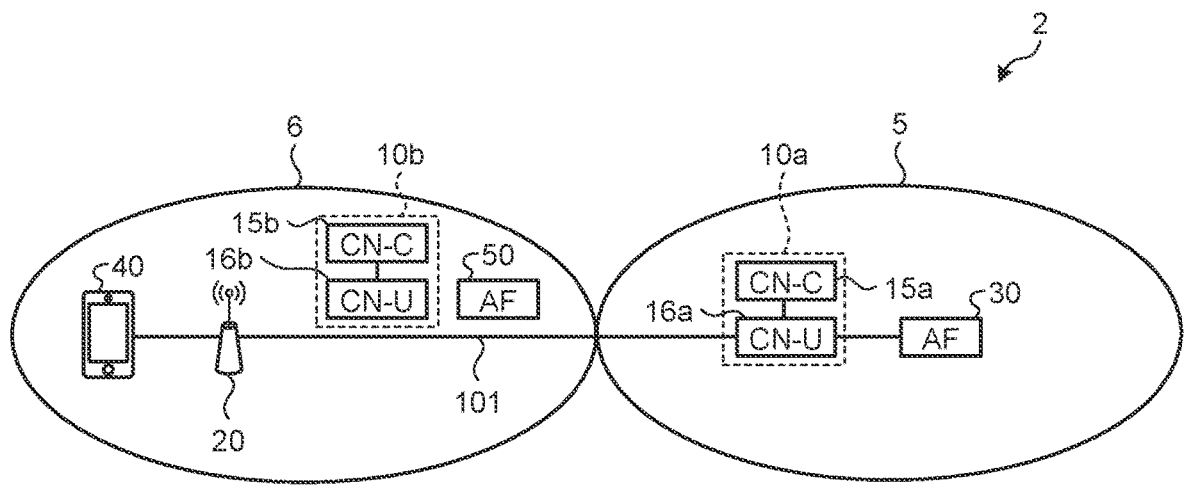
FIG. 11 is a diagram illustrating an example of a configuration of a communication system according to a second embodiment of the present disclosure.

FIG. 11 is a diagram illustrating an example of a configuration of a communication system according to the second embodiment of the present disclosure. As illustrated in FIG. 11, as compared with the communication system 1 of the first embodiment, a communication system 2 further includes an application function 50 (AF 50) in the network slice 6.

<3-2. Operation of Communication System>

Next, an operation of the communication system 2 will be described.

First, in the communication system 2, as illustrated in FIG. 11 as an initial state, it is assumed that the terminal device 40 is connected to the core network 10a installed as on-cloud installation (CN-U 16a). Furthermore, the present embodiment will describe a case where the connection destination of the terminal device 40 required to have low latency is shifted from the core network 10a installed as on-cloud installation to the core network 10b installed as on-premises installation. A state of operation of communication system 2 will be described with reference to FIGS. 12 to 15. FIGS. 12 to 15 are diagrams illustrating an example of switching of the core network according to the second embodiment of the present disclosure.

Similarly to the first embodiment, the AF 30 periodically measures the latency between the AF 30 and the terminal device 40. When having determined that the latency is a threshold being a reference for switching from on-cloud installation to on-premises installation or less, the AF 30 instructs the AF 50 installed as on-premises installation to start synchronization. Alternatively, the terminal device 40 may perform the determination and instruct the application on the AF 30 side to start synchronization from the application on the UE side. In this case, based on the measured latency, the terminal device 40 transmits a request for switching to the on-premises installation to the AF 30. Based on the received switching request, the AF 30 instructs the AF 50 installed as on-premises installation to start synchronization.

Figure 12:
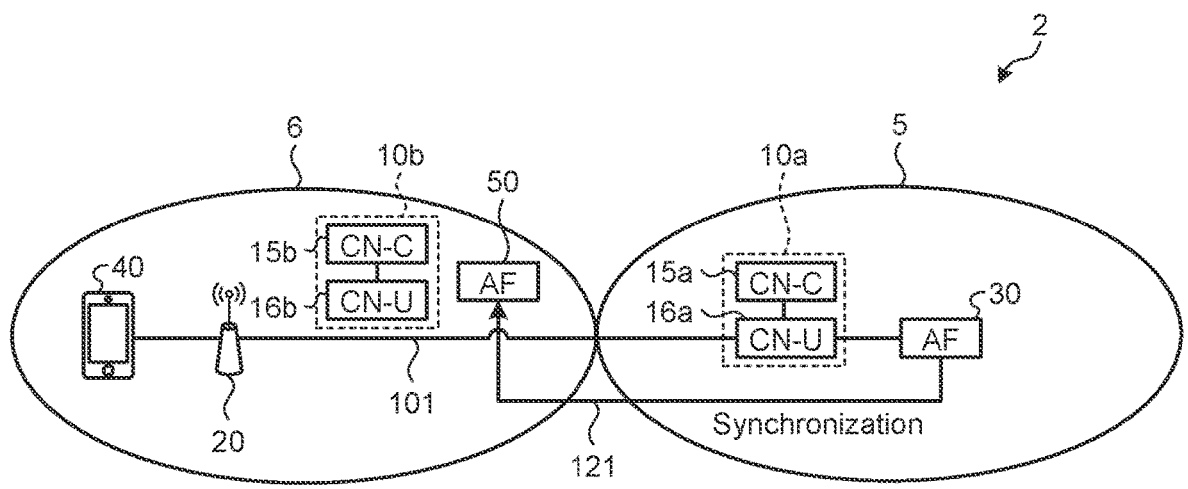
FIG. 12 is a diagram illustrating an example of switching of a core network according to the second embodiment of the present disclosure.

As illustrated in FIG. 12, the AF 30 starts transfer regarding its own internal state to the AF 50 via a route 121, and continuously performs synchronization until being instructed to stop. Synchronization between the AF 30 and the AF 50 uses an application programming interface (API) included in the AF 30 and the AF 50. When the AF 30 issues a request regarding transfer of the internal state via the API, the AF 50 that has received the request via the API makes preparations for receiving the transfer of the internal state. Next, the AF 30 outputs the internal state to a JavaScript (registered trademark) Object Notation (JSON) format file, and transmits the file to the AF 50.

Examples of information described in the JSON format file are as follows. "Information regarding video". This is information indicating where to start next playback, such as a playback time. The information includes, in a game, information such as "information indicating where the lead character is on the map", "state of item held by the lead character", "number of turn in turn-based game", and "information of key input of game user in key input synchronous game". This also includes "directional information" in a case where a video is being transmitted in accordance with a direction in which the user is facing in the content viewing VR.

The AF 30 transmits a switching request for using the core network 10b installed as on-premises installation to the CN-C 15a of the core network 10a connected to the terminal device 40.

Having received the switching request from the AF 30, the CN-C 15a notifies the CN-C 15b of the core network 10b installed as on-premises installation of the IMSI of the terminal device 40 and the state information indicating the state of the terminal device 40.

Figure 13:
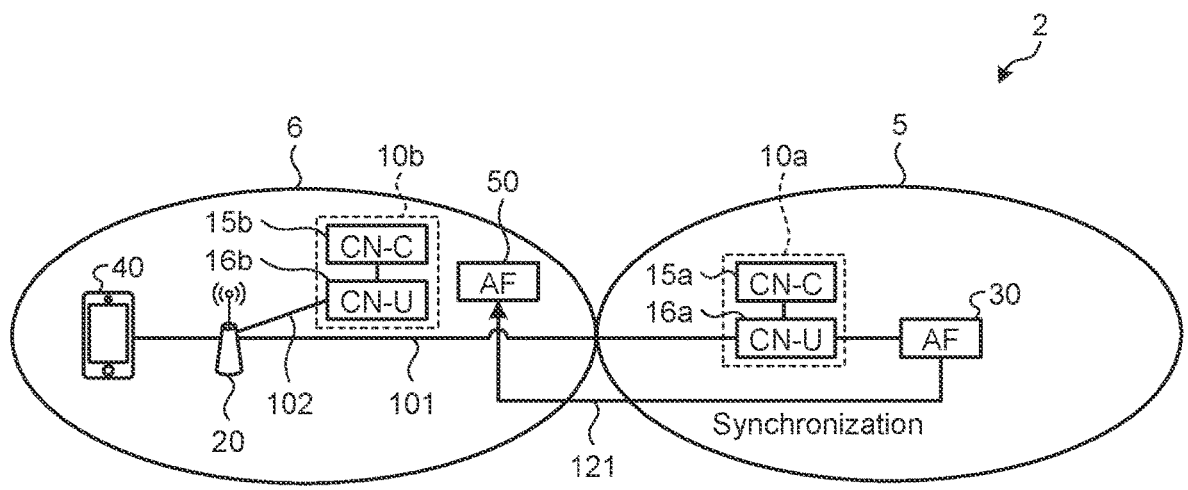
FIG. 13 is a diagram illustrating an example of switching of the core network according to the second embodiment of the present disclosure.

As illustrated in FIG. 13, having received the IMSI and the state information of the terminal device 40 from the CN-C 15a, the CN-C 15b sets the route 102 similarly to the first embodiment. In addition, the CN-C 15a sets the base station device 20 to pass the traffic to the core network 10b side for uplink traffic. That is, the base station device 20 passes the same traffic through the routes 101 and 102.

Figure 14:
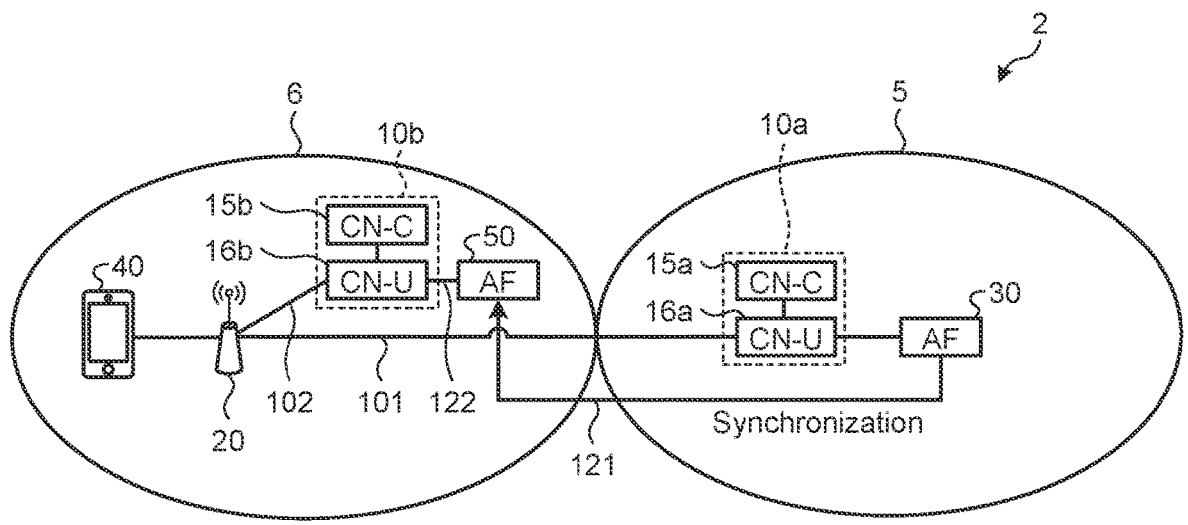
FIG. 14 is a diagram illustrating an example of switching of the core network according to the second embodiment of the present disclosure.

The CN-C 15a notifies the AF 50 that the connection destination is the CN-U 16b. As illustrated in FIG. 14, the AF 50 is connected to the CN-U 16b via a route 122 so as to pass the mutual traffic between the AF 50 and the base station device 20 via routes 102 and 122.

The CN-C 15a instructs the terminal device 40 to use the AF 30 instead of the AF 50. Note that this instruction can be omitted. That is, when the terminal device 40 is communicating with the AF 30 and the user data is transferred to the AF 50 via the base station device 20 and the CN-U 16b, even if the AF 30 is shifted to the AF 50, the terminal device 40 can continue the communication without recognizing such shift.

Figure 15:
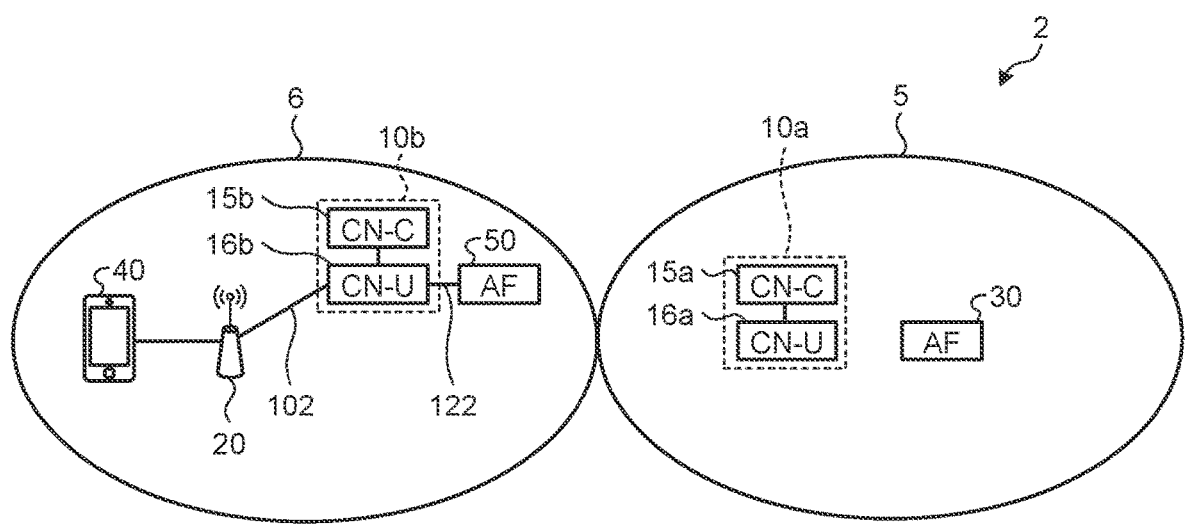
FIG. 15 is a diagram illustrating an example of switching of the core network according to the second embodiment of the present disclosure.

When traffic runs between the terminal device 40 and the AF 50, the CN-C 15a instructs the AF 30 to stop synchronization with the AF 50 and operation. Furthermore, the CN-C 15a transmits, to the base station device 20, a stop signal for stopping the transmission of the packet for the CN-U 16a. That is, as illustrated in FIG. 15, the CN-C 15a sets the base station device 20 to stop the transmission of the packet for the CN-U 16a and allows only transmission of the packet for the CN-U 16b. In this manner, the communication system 2 enables the core network 10a and the AF 30 to be switched to the core network 10b and the AF 50, respectively. That is, the communication system 2 can seamlessly switch the core network and the AF.

Next, switching processing in the second embodiment will be described with reference to a sequence diagram. FIG. 16 is a sequence diagram illustrating an example of switching processing according to the second embodiment of the present disclosure. As illustrated in FIG. 16, based on the measured latency, the terminal device 40 transmits a request for switching to the on-premises installation to the AF 30 (step S51). Based on the switching request, the AF 30 instructs the AF 50 installed as on-premises installation to start synchronization (step S52). The AF 30 starts transfer of its own internal state to the AF 50 (step S53), and continuously performs synchronization until being instructed to stop (step S54).

The AF 30 transmits a switching request for using the core network 10b installed as on-premises installation to the CN-C 15a (step S55). Having received the switching request from the AF 30, the CN-C 15a notifies the CN-C 15b of the IMSI of the terminal device 40 and the state information indicating the state of the terminal device 40 (step S56). Having received the IMSI and the state information of the terminal device 40 from the CN-C 15a, the CN-C 15b establishes a U-Plane between the base station device 20 and the CN-U 16b (step S57).

The CN-C 15a notifies the AF 50 that the connection destination is the CN-U 16b (step S58). The CN-C 15a sets the base station device 20 to cause the traffic to flow also to the core network 10b side for the uplink traffic (step S59). The base station device 20 passes the same traffic to the CN-U 16a and the CN-U 16b (step S60).

The CN-C 15a instructs the terminal device 40 to use the AF 30 instead of the AF 50 (step S61). The CN-C 15a instructs the AF 30 to synchronize with the AF 50 and stop the operation (step S62). The CN-C 15a transmits, to the base station device 20, a stop signal for stopping the transmission of the packet for the CN-U 16a (step S63). This makes it possible to seamlessly switch the core network and the AF.

4. Modifications

Each of the above embodiment is an example, and various modifications and applications are possible.

In each of the above embodiments, the CN-C 15a mainly performs the switching processing, but the subject of switching processing is not limited thereto. For example, it is allowable to have a configuration in which a control station different from the CN-C 15a is provided in the network slice 5, and the control station performs the switching processing.

Although each of the above embodiments have described a case where switching is performed from the on-cloud network slice 5 to the on-premises network slice 6, the technology is similarly applicable to a case of switching from the on-premises network slice 6 to the on-cloud network slice 5.

In addition, the processing device (control device) that controls the core network 10, the base station device 20, or the terminal device 40 of each of the above embodiments may be realized by a dedicated computer system or a general-purpose computer system.

For example, a control program for executing the above-described operations is stored in a computer-readable recording medium such as an optical disk, semiconductor memory, a magnetic tape, or a flexible disk and distributed. For example, the program is installed on a computer and the above processing is executed to achieve the configuration of the control device. At this time, the control device may be a device (for example, a personal computer) outside the core network 10, the base station device 20, or the terminal device 40. Furthermore, the control device may be a device (for example, the control unit 13, the control unit 24, or the control unit 45) inside the core network 10, the base station device 20, or the terminal device 40.

Furthermore, the control program may be stored in a disk device included in a server device on a network such as the Internet so as to be able to be downloaded to a computer, for example. Furthermore, the functions described above may be realized by using operating system (OS) and application software in cooperation. In this case, the sections other than the OS may be stored in a medium for distribution, or the sections other than the OS may be stored in a server device so as to be downloaded to a computer, for example.

Furthermore, among each processing described in each of the above embodiments, all or a part of the processing described as being performed automatically can be manually performed, or the processing described as being performed manually can be performed automatically by a known method. In addition, the processing procedures, specific names, and information including various data and parameters illustrated in the above specifications or drawings can be changed in any manner unless otherwise specified. For example, various types of information illustrated in each of the drawings are not limited to the information illustrated.

In addition, each of components of each device is provided as a functional and conceptional illustration and thus does not necessarily need to be physically configured as illustrated. That is, the specific form of distribution/integration of each device is not limited to those illustrated in the drawings, and all or a part thereof may be functionally or physically distributed or integrated into arbitrary units according to various loads and use conditions.

Furthermore, each of the above-described embodiments can be appropriately combined within a range implementable without contradiction of processing. Furthermore, the order of individual steps illustrated in the sequence diagram of each of the above embodiments can be changed as appropriate.

Furthermore, for example, each of the above embodiments can be implemented as any configuration constituting a device or a system, for example, a processor as a large scale integration (LSI) or the like, a module using a plurality of processors or the like, a unit using a plurality of modules or the like, or a set obtained by further adding other functions to the unit (that is, a configuration of a part of the device).

In each of the above embodiments, a system represents a set of a plurality of components (devices, modules (components), or the like), and whether all the components are in the same housing would not be a big issue. Therefore, a plurality of devices housed in separate housings and connected via a network, and one device in which a plurality of modules is housed in one housing, are both systems.

Furthermore, for example, each of the above embodiments can adopt a configuration of cloud computing in which one function is cooperatively shared and processed by a plurality of devices via a network.

5. Summary

As described above, according to an embodiment of the present disclosure, the control device (CN-C 15a) includes a control unit. The control unit acquires a switching request based on the latency measured by the first application function (AF 30) disposed in the first network slice (network slice 5) or the terminal device 40 communicating with the first AF. Based on the acquired switching request, the control unit switches the core network connected with the terminal device 40 from the first core network (core network 10a) disposed in the first network slice to the second core network (core network 10b) disposed in the second network slice (network slice 6) using the first AF, or the first AF and the terminal device 40, as an anchor. This makes it possible, as a result, to seamlessly switch the core network.

The first network slice is on-cloud and the second network slice is on-premises. This makes it possible, as a result, to seamlessly switch the on-cloud core network to the on-premises core network.

The control unit works as a network slice selection function (NSSF). This makes it possible, as a result, to seamlessly switch the core networks having different installation positions, as network slice switching.

The control unit transfers information indicating the state of the terminal device 40 held in the first core network to the second core network. This makes it possible, as a result, to seamlessly switch the core network.

After having a state in which the terminal device 40 is simultaneously connected to the first core network and the second core network, the control unit executes switching from the first core network to the second core network. This makes it possible, as a result, to seamlessly switch the core network without causing the user of the terminal device 40 to be aware of the switching.

After synchronizing the internal state of the first AF with the internal state of the second AF arranged in the second network slice, the control unit executes switching from the first core network to the second core network. This makes it possible, as a result, to seamlessly switch the application function.

After switching from the first core network to the second core network is completed, the control unit stops synchronization of the internal states. This makes it possible, as a result, to release the resources of the first AF.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and a modification as appropriate.

The effects described in individual embodiments of the present specification are merely examples, and thus, there may be other effects, not limited to the exemplified effects.

Note that the present technology can also have the following configurations.

(1)
A control device comprising a control unit configured to:
  acquire a switching request based on a latency measured in a first application function (AF) disposed in a first network slice or in a terminal device communicating with the first AF; and
  switch, based on the acquired switching request, a core network to be connected to the terminal device from a first core network disposed in the first network slice to a second core network disposed in a second network slice by using the first AF, or using the first AF and the terminal device, as an anchor.

(2)
The control device according to (1),
wherein the first network slice is on-cloud, and the second network slice is on-premises.

(3)
The control device according to (1) or (2),
wherein the control unit works as a network slice selection function (NSSF).

(4)
The control device according to any one of (1) to (3),
wherein the control unit transfers information indicating a state of the terminal device held in the first core network to the second core network.

(5)
The control device according to any one of (1) to (4),
wherein, after having a state in which the terminal device is simultaneously connected to the first core network and the second core network, the control unit executes switching from the first core network to the second core network.

(6)
The control device according to (5),
wherein, after synchronizing an internal state of the first AF with an internal state of a second AF disposed in the second network slice, the control unit executes switching from the first core network to the second core network.

(7)
The control device according to (6),
wherein the control unit stops synchronization of the internal states after switching from the first core network to the second core network is completed.

(8)
A control method executed by a computer, the method comprising processing of:
  acquiring a switching request based on a latency measured in a first application function (AF) disposed in a first network slice or in a terminal device communicating with the first AF; and
  switching, based on the acquired switching request, a core network to be connected to the terminal device from a first core network disposed in the first network slice to a second core network disposed in a second network slice by using the first AF, or using the first AF and the terminal device, as an anchor.

(9)
A control program that causes a computer to execute processing, the processing including:
  acquiring a switching request based on a latency measured in a first application function (AF) disposed in a first network slice or in a terminal device communicating with the first AF; and
  switching, based on the acquired switching request, a core network to be connected to the terminal device from a first core network disposed in the first network slice to a second core network disposed in a second network slice by using the first AF, or using the first AF and the terminal device, as an anchor.

REFERENCE SIGNS LIST 1, 2 Communication System
5, 6 Network Slice
10, 10a, 10b Core Network
15a, 15b CN-C
16a, 16b CN-U
20 Base Station Device
30, 50 Application Function (AF)
40 Terminal Device
11, 21, 41 Communication Unit
12, 22, 42 Storage Unit
13, 24, 45 Control Unit
23, 43 Network Communication Unit 44 Input/Output Unit
101, 102, 103, 121, 122 Route
211, 411 Reception Processing Unit
211a Radio Receiver
211b Demultiplexer
211c Demodulator
211d Decoder
212, 412 Transmission Processing Unit
212a Coder
212b Modulator
212c Multiplexer
212d Radio Transmitter
214, 414 Antenna

The invention claimed is:

1. A control device, comprising: a control unit configured to:
- acquire a switching request based on a latency measured in a first application function (AF) disposed in a first network slice or in a terminal device communicating with the first AF; and
- switch, based on the acquired switching request, a core network to be connected to the terminal device from a first core network disposed in the first network slice to a second core network disposed in a second network slice by using the first AF, or using the first AF and the terminal device, as an anchor.

2. The control device according to claim 1,
wherein the first network slice is on-cloud, and the second network slice is on-premises.

3. The control device according to claim 1,
wherein the control unit works as a network slice selection function (NSSF).

4. The control device according to claim 1,
wherein the control unit is further configured to transfer information indicating a state of the terminal device held in the first core network to the second core network.

5. The control device according to claim 1,
wherein, after having a state in which the terminal device is simultaneously connected to the first core network and the second core network, the control unit is further configured to execute switching from the first core network to the second core network.

6. The control device according to claim 5,
wherein, after synchronizing an internal state of the first AF with an internal state of a second AF disposed in the second network slice, the control unit is configured to execute switching from the first core network to the second core network.

7. The control device according to claim 6,
wherein the control unit is further configured to stop synchronization of internal states after switching from the first core network to the second core network is completed.

8. A control method comprising:
- acquiring a switching request based on a latency measured in a first application function (AF) disposed in a first network slice or in a terminal device communicating with the first AF; and
- switching, based on the acquired switching request, a core network to be connected to the terminal device from a first core network disposed in the first network slice to a second core network disposed in a second network slice by using the first AF, or using the first AF and the terminal device, as an anchor.

* * * * *